United States Patent [19]

Fehlmann

[11] Patent Number: 4,602,962
[45] Date of Patent: Jul. 29, 1986

[54] PROCESS FOR PRODUCING AN EXPANDED MINERAL MATERIAL

[76] Inventor: Hans B. Fehlmann, Seestrasse 140, CH-8700 Küsnacht, Switzerland

[21] Appl. No.: 648,597

[22] Filed: Sep. 10, 1984

[30] Foreign Application Priority Data

Sep. 13, 1983 [CH] Switzerland ............... 4979/83

[51] Int. Cl.$^4$ ............................................. C09C 3/00
[52] U.S. Cl. ................... 106/309; 106/288 B; 501/84
[58] Field of Search ............... 106/288 B, 309

[56] References Cited

U.S. PATENT DOCUMENTS

| | | | |
|---|---|---|---|
| 2,676,892 | 4/1954 | McLaughlin | 106/86 |
| 2,978,340 | 4/1961 | Lyndhurst et al. | 106/40 |
| 3,030,215 | 4/1962 | Lyndhurst et al. | 106/40 |
| 3,838,998 | 10/1974 | Matthews et al. | 106/50 |

Primary Examiner—Prince E. Willis
Assistant Examiner—Willie J. Thompson

[57] ABSTRACT

An expanded mineral material suitable for use as a filler, e.g. instead of or in addition to sand or gravel in concrete mixes, is produced by dropping a stream of solid pellets into a rising stream of heated gas contained in a substantially vertical reactor space; the pellets consist essentially of a fusible mineral composition and a latent blowing agent; while falling in counter-current to the gas stream the pellets are heated progressively and expand at least to the point where they are capable to float in the gas stream and are carried in concurrent motion with the gas stream out of the reactor space. This reversal of motion of the expanding particles provides for a substantially self-regulating residence period of the particles in the expansion zone resulting in substantially improved process control and economy.

7 Claims, 4 Drawing Figures

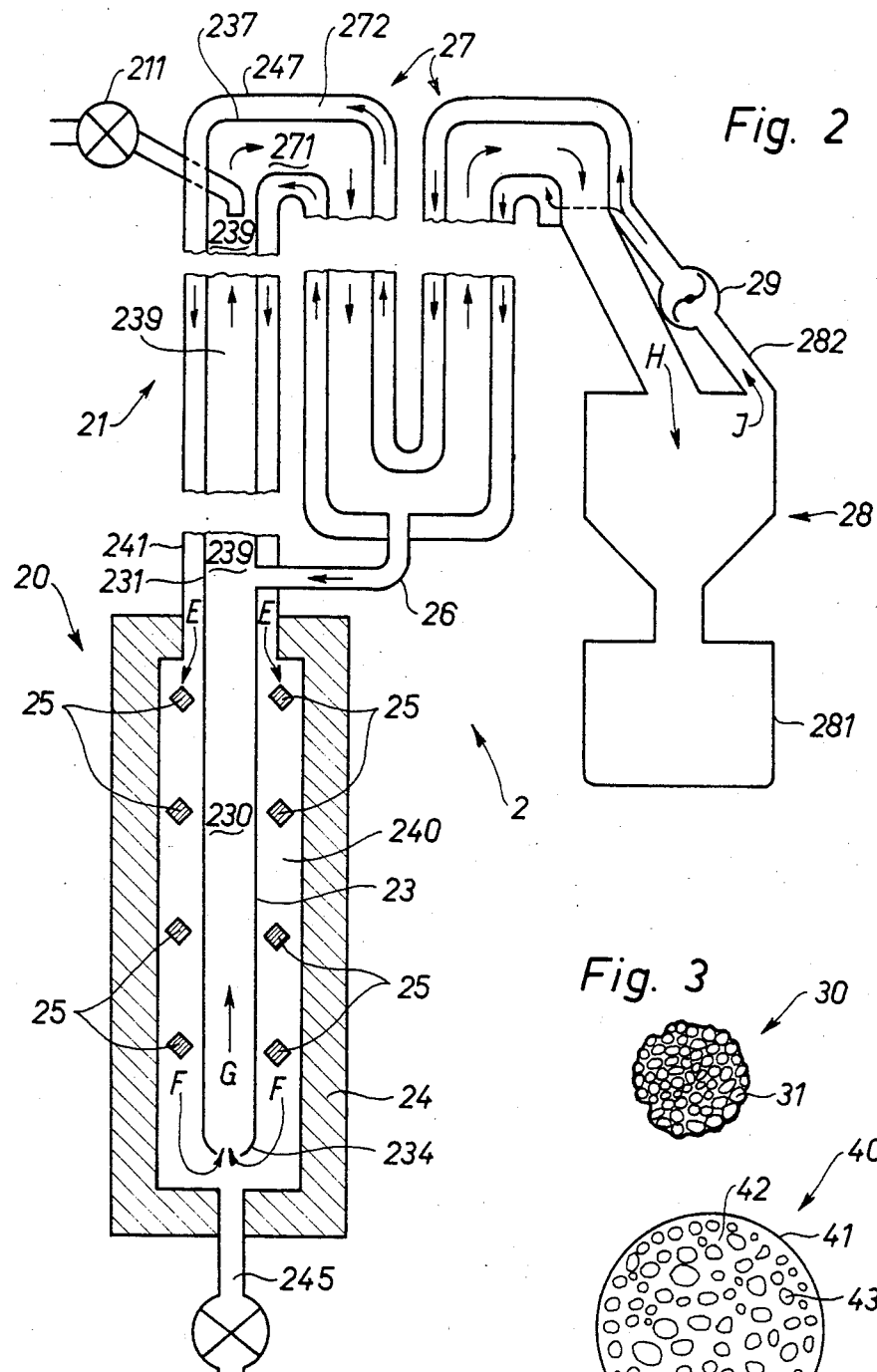
Fig. 2
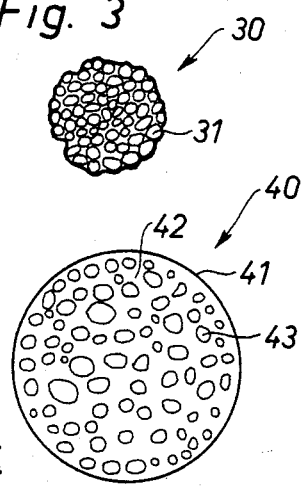
Fig. 3
Fig. 4

PROCESS FOR PRODUCING AN EXPANDED MINERAL MATERIAL

BACKGROUND OF THE INVENTION

This invention relates to the production of an expanded mineral material suitable for use as a constituent or filler for concrete and other composite materials that contain a hydraulic or other type of binder and at least one particulate inorganic filler having a particle size in the range of typically from 0.1 to 20 mm.

Conventional concrete mixes consist essentially of cement, water, and a mineral filler which, depending upon its grain size, is termed "sand" or "gravel" and preferably consists of alluvial matter or "pebbles", i.e. particles of stone worn round and smooth by geo-formative forces and having a typical diameter of up to about 50 mm. Accordingly, both the sand as well as the gravel constituent of concrete may consist of "pebbles" and this latter term is used herein generically to indicate a generally round or spheroidal outer shape of individual mineral particles regardless of whether their diameters would be that of fine, medium or coarse sand (up to about 2 mm) or that of fine to medium gravel (above 2 mm). Particle sizes given herein are the maximum dimensions or "diameters" of generally spherical or spheroidal particles.

For producing improved construction materials including light-weight concrete it is known in the art to use bulky mineral "fillers" or additives such as expanded glass, expanded clay, or expanded mica. These conventional additives are obtained by heating a mineral composition, generally in the form of a stream of individual particles or pellets that contain a "latent blowing agent", i.e. a compound or constituent capable of producing gaseous matter, e.g. carbon dioxide or water vapor, when heated; the latent blowing agent may be incorporated into a preblend that is used to form precursor particles or pellets for subsequent thermal expansion, or may be a natural constituent, such as chemically bound water or a carbonate component of a mineral substance.

Specifically, expanded clay or expanded mica for use as a mineral filler is generally produced by passing a stream of particulated mineral material through a rotary kiln, that is, a cylindrical furnace revolving about an axis inclined at an angle of 5° to 20° towards the horizontal. The particles within the rotary kiln move or roll in contact with the furnace wall so that the outer layer or skin of the final particles will be rough and broken. Further, the structure of the internal voids will, in general, be "porous" in the sense that most voids, e.g. more than 50% communicate with each other; "cellular" structures, on the other hand, have fewer and typically less than 50% voids that communicate with one or more other voids.

A process for producing thermally expanded clay is disclosed in U.S. Pat. No. 2,676,892, for example, and use of vertical kilns or expansion reactors is known for producing expanded glass particles, e.g. as disclosed in U.S. Pat. No. 3,838,998 for making small hollow glass spheres, or in U.S. Pat. Nos. 2,978,339 and 3,030,215 for production of glass particles of which a desired majority (typically 70%) has a single void and an undesirable minority (typically 10%) has a porous structure while another undesirable portion (typically 20%) consists of unexpanded massive glass globules.

Prior art expanded mineral fillers suitable for concrete and the like have one or more of the following defects: the skin of the particles is rough and broken as a consequence of contact with the wall of the kiln during thermal expansion; the internal structure is porous rather than cellular in the sense defined above; mechanical or/and chemical stability under the conditions of use as a filler in concrete mixes is/are insufficient either because the expanded particles have an inherently low structural strength and/or low resistance against the environment typical in concrete mixes, or because the aqueous constituent of the mix will penetrate through the skin or its broken portions into the voids within the expanded particles; further, prior art production methods are costly and/or difficult to control.

Because of these defects, expanded materials obtained by prior art methods are far from ideal for use as a light-weight sand or gravel constituent of concrete or for other purposes where a generally stable and resistant low-cost light-weight mineral filler is desirable.

Such an improved light-weight material, also termed "expanded pebble material" herein, would be of use to replace, entirely or in part, sand and gravel constituents of concrete mixes, notably for construction purposes or for production of preformed construction elements, such as panels or blocks, and other uses where a substantially decreased specific weight and improved insulation (thermal and acoustic) of a structure or construction would be advantageous.

Now, according to the best knowledge of the inventor, no prior art method is capable to produce such a material and it is a main object of the present invention to provide for an improved process of producing an expanded mineral material suitable for the above described uses.

For production of small hollow glass spheres as disclosed in the above cited U.S. Pat. Nos. 2,978,339 and 2,978,340 and for production of hollow glass microspheres it is known to avoid contact between the fused glass and the oven by continuously dropping pellets of glass or glass-forming matter and a latent blowing agent into a vertical chamber in which a hot gas is moving upward and in counter-current to the pellets which are progressively heated to fuse and to expand.

According to these prior art methods, the expanded particles continue to move in a downward direction towards the lower end of the chamber where they are cooled and collected. The mass of the unexpanded pellets is critical because the amount of heat required for expanding the pellets to form the hollow globules increases geometrically with such mass. The extremely close process control required is prohibitive when production of a low-cost leight-weight filler for use as expanded pebbles in concrete is considered.

Further, and even more important, the sand and gravel constituent of a concrete mix must consist of granules or pebbles of differing diameters; if the sand and gravel constituent of a concrete mix is to consist substantially of expanded particles, such particles must be provided in relatively wide distribution of particle sizes, e.g. between 0.2 and 10 mm. So, if a prior art expansion method would be used wherein a substantially constant particle mass is critical because of heat transfer problems, simultaneous production of expanded particles of differing diameters would not be possible.

SUMMARY OF THE INVENTION

Now, it has been found according to the invention that important advantages will be achieved in the production of expanded mineral materials when the motion of the pellets dropped into the hot gas stream is reversed during expansion in the sense that the unexpanded pellets are allowed to first fall in counter-current motion to the rising stream of hot gas until they have expanded to a degree at which they begin to float in the gas stream; as a consequence, the motion of the unexpanded particles counter-current to the hot gas stream will be slowed down to virtual standstill of the particles within the reactor and then reversed so that the fully expanded particles will move with the gas stream, i.e. in concurrent motion therewith, and will be fed out of the reactor together with that gas stream for subsequent recovery of the expanded particles.

The use of gas streams for carrying solid particles in concurrent motion with the stream is known per se from many types of pneumatic conveyors and also for formation of glass shot as disclosed, for example, in U.S. Pat. No. 2,947,115; however, the solid particles move in the same direction as the gas stream and no reversal of particle motion relative to the carrier stream is involved or intended and no advantage would be obtained by reversal of particle motion when the intended product consists of massive glass globules.

Three different types, or modes, of movement of pellets (having a spherical or spheroidal shape, a diameter of between 0.1 and 20 mm and a specific weight in the range of 1 to 3) dropped into a rising gas stream can be envisaged: when gas velocity is relatively low and specific particle mass relatively high, the particle will fall into the gas stream; soon, an equilibrium between gravitation and aerodynamic resistance is reached and the particle will continue to fall at a substantially constant speed through the gas; this will be referred to herein as the first or counter-current mode of movement; for simplicity it can be assumed here that the velocity of the falling pellets and the velocity of the rising gas stream are roughly substractive in first-mode movement.

In the other extreme, at high gas velocity and low specific particle mass, the aerodynamic resistance will exceed the gravitational pull and the particle will not fall into the stream but move concurrently therewith, i.e. rise with the gas stream, though generally at a lower speed because of the residual effect of gravity; because of the intermediate mode described below, concurrent movement of a solids particle in a rising stream of gas will be referred to as the third or concurrent mode of movement.

The type of motion intermediate between counter-current and concurrent mouvement of a solids particle in a rising gas stream will be achieved when the force of gravity acting upon the particle will be the same as the counteracting "aerodynamic force" exerted by the rising gas stream upon the particle; such "aerodynamic force" is a complex entity including friction, turbulent suction as well as other factors including viscosity of the gas, limited areas of transition from laminar to non-laminar flux, and the like parameters of non-ideal behaviour. Floating of a particle in a gas stream, i.e. virtual stand-still with reference to an external point of reference, will also be termed second-mode motion herein.

While full mathematical analysis and definition of the "aerodynamic force" required to balance gravitation would be extremely complex, second-mode motion is observed phenomenologically and can be easily manipulated as explained in more detail below. It should be understood, however, that the inventive process does not aim at any particular length of the floating state of a particle but at complete reversal of particle motion from the first to the third motion of the particle in the reaction zone.

Optimum conditions for carrying out the inventive process in a given system (including pellet size, fusion temperature, activation temperature and activity of the latent blowing agent, heat exchange between pellets and gas, temperature gradient within gas stream, gas velocities in various parts of the reaction zone) need not be limited because the result to be achieved—reversal of particle motion—can be controlled in a simple test run in which the pellets to be used are dropped into the particular reactor while maintaining a velocity of the rising hot gas such that all pellets will start to move in counter-current motion (1st mode) through the reactor space that contains the rising hot gas stream over a reactor space length sufficient for fusion of the mineral composition and activation of the latent blowing agent to achieve thermal expansion of substantially all pellets.

As a consequence of thermal expansion of the particles while in counter-current motion, their volume increases typically by a factor of from about 1.5 to 15, depending upon the intended end use of the expanded pebbles; while the increase of volume can be influenced by the type and amount of the latent blowing agent as explained in more detail below, the essential reversal of particle motion will always be achieved when the velocity of the rising gas stream is lower than required for second-mode motion of the unexpanded pellets but high enough for second-mode motion of pellets in the state of partial or incipient expansion.

Any volume increase of the pellets will increase the aerodynamic force that counteracts the gravitational force and one or more of the process parameters mentioned above could be varied; as a matter of practice, proper selection of the velocity of the rising hot gas stream is a particularly preferred control parameter because this provides for self-regulation when expanding pellets of differing parameters. For example, assuming that a target product consisting of a mixture of expanded pebbles suitable as the only sand/gravel constituent of a concrete mix is to be made according to the invention, the product must consist of expanded pebbles having differing diameters at least in the range of from about 0.2 to about 10 mm. Assuming a typical medium expansion factor of about 5 to about 10, the starting pellets should be a mixture of pellets having diameters in the range of from about 0.1 to about 3 mm.

Pellets of such differing diameters require quite different amounts of heat for fusion and expansion because of the cubic relation between diameter and volume. Since heat transfer is, to some extent at least, a time-dependent parameter, pellets of differing diameters require substantially different heating or residence times for adequate expansion. However, for operation of the inventive process it will generally be sufficient to provide for second-mode motion of the largest pellets near the lower end of the reaction zone and this may be reached well before full expansion of the pellets is reached.

Then, additional heat will be exchanged while second-mode motion continues and while third-mode motion carries the expanded particle out of the expansion zone. Assuming, as an example, a length of the heating zone in the range of from about 20 to about 40 meters and a velocity of the rising gas stream in the range of from 5 to 10 meters per second (m/sec) this will normally result in an effective (relative to an outside point of reference) falling velocity of the unexpanded pellets in the range of from 1 to 4 m/sec. Consequently, pellets can remain in heat exchange with the rising gas stream for periods between 5 and 40 seconds in counter-current motion and for an additional period in floating and in concurrent motion. In general, the reaction zone will have its hottest area (e.g. 1000°–1400° C.) near its lower end.

Now, as the pellets start to expand while still in first or counter-current motion and as the aerodynamic force acting against gravity increases progressively with the volume of the expanding pellets, motion of all pellets will be reversed at some point of the reaction zone if the pellets with the largest unexpanded diameter reach second-mode motion somewhere above the lower end of the reaction zone.

Generally, the smaller a given pellet or particle is, the smaller will be the amount of heat required for fusion and expansion, and such particles will reach transition from first into third mode of motion within a shorter time and a shorter path of travel in the first mode of motion so that they will start to float in the rising gas stream at a comparatively higher level within the reactor, i.e. closer to the upper reactor end.

A relatively larger pellet or particle, on the other hand, requires more heat for fusion and expansion and, hence, a longer path of travel in the first mode of motion and will start to float at a comparatively lower level within the reactor, i.e. closer to its lower end. If a pellet or particle fails to achieve the second mode of motion at the lower reactor end, it will not form an expanded pebble; however, a relatively small increase of the hot-gas-velocity throughout the reactor, or near its lower end, will normally be sufficient to assure that substantially all pellets that have a predetermined upper diameter or maximum mass will start to float above the lower reactor end. Generally, well defined upper and lower limits of the pellet diameter range are desirable and can be achieved by simple methods such as sieving.

Generally, the reversion of particle movement as a consequence of expansion even though unexpanded pellets of substantially differing diameters are dropped into the hot gas stream provides for an essentially self-regulating process according to the invention in that each pellet and expanding particle will choose the residence time it needs for expansion, and that such self-regulation can be achieved by such simple means as sieving the pellets and/or controlling the hot gas velocity.

Fusible mineral materials suitable for producing expanded pebbles according to the invention generally are silicaceous compositions that contain silica ($SiO_2$) and at least one further inorganic and preferably oxidic compound capable of reducing the fusion temperature of the composition to below about 1400° C. In general, the silica content will be in the range of from about 35 to about 95% by weight; the further inorganic compound preferably is an oxide selected from alumina ($Al_2O_3$), calcium oxide (CaO), magnesium oxide (MgO), iron oxide ($Fe_2O_3$), oxides of the alkali metals ($Me_2O$), and binary, tertiary, quaternary or higher order mixtures thereof as most of the remaining portion.

Other inorganic compounds known as constituents of fusible mineral compositions may be present, e.g. $TiO_2$, MnO, $B_2O_3$, $P_2O_5$, etc., or mixtures thereof, in minor amounts in a typical total of below about 10% by weight.

The above constituents are recited as oxides but this is indicative merely of analysis; the constituents actually used for producing the pellets may include complex oxidic compounds such as naturally occuring minerals as well as precursor compounds of oxides, e.g. carbonates, that yield the required oxidic component when heated for fusion.

In view of the low-cost objective, waste or refuse-type substances of natural or man-made origin are preferred for the fusible mineral composition; specific preferred examples include vitreous materials, such as waste glass, mineral ashes, such as fly ash, obtained upon combustion of coal or other organic matter, alluvial sediment substances, such as fines obtained from gravel production (washing fines) or from sediments in natural water bodies, such as rivers, lakes and the sea (e.g. dredged-up deposits), sand, solid slag-type combustion residues and mixtures of the above material.

Some composition ranges typical of mineralic residues for use herein are given in Table I below.

TABLE I

| Type Substance | Analysis Data of Mineral Waste Materials (in % by weight after heating at 1500° C. to constant weight) | | |
|---|---|---|---|
| | Alluvial Sediments (Fines) | Fly-Ash | Vitreous Waste |
| $SiO_2$ | 35–60 | 5–50 | 35–95 |
| $Al_2O_3$ | 5–20 | 5–30 | 0–30 |
| CaO | 10–50 | 10–50 | 0–15 |
| MgO | 2–15 | 10–40 | 0–12 |
| $Fe_2O_3$ | 2–8 | 5–20 | 0–2 |
| $Na_2O$ | 0.5–2.5 | 0.5–5 | 0.5–15 |
| $K_2O$ | 0.5–2.5 | 0.5–5 | 0–20 |
| Others (e.g. $TiO_2$, $P_2O_5$, $B_2O_3$) | 0–5 | 0–5 | 0–2 |

Generally, the mineral composition of the pellets should yield expanded particles that are substantially insoluble in aqueous media even at pH values in the moderately acid or moderately basic range. Potentially toxic constituents are not preferred.

Preferably, the fusion or softening temperature of the mineral composition is in the range between 800° and 1400° C., the range of from 1000° to 1300° C. being particularly preferred.

For preparing pellets suitable for the inventive process, the mineral substance and all solid constituents of the pellets should be in a finely divided state, i.e. have a particle size of below 100 $\mu$m and preferably below 50 $\mu$m. Many silicaceous mineral waste materials such as alluvial sediments and fly-ash meet this requirement; other materials or additives may require milling. However, as particle size reduction adds to processing costs, the use of mineral waste fines is preferred, at least for a major portion of the pellet constituents.

A second necessary constituent of the pellets is the latent blowing agent; its selection will depend upon the fusion or softening temperature of the mineral composition because the activity of the blowing agent, i.e. the development of a significant amount of a gaseous product such as carbon dioxide, oxygen or nitrogen, should not start until the outermost portion or skin of a pellet has been fused. Generally, the activation temperature of the latent blowing agent should be higher than the fusion or softening temperature of the mineral composition.

Many examples of latent blowing agents having activation temperatures in the range of interest herein are known and include such compounds as inorganic carbonates, sulfates, nitrates, and oxides of metals selected from alkali metals, alkaline earth metals, aluminum, iron, cobalt, manganese, titanium, chromium, nickel, copper, and zink.

Other compounds suitable for use as a latent blowing agent are inorganic compounds, such as carbides, known to be stable at temperatures of up to 800° C. but are reactive with constituents of the fusible mineral composition. Silican carbide is a specific example and a known blowing agent for producing expanded glass.

Further examples include inorganic compounds that catalyse or promote decomposition of inorganic oxides at temperatures in the range of from 1100° to 1300° C.

Numerous inorganic compounds are known to decompose at specified temperatures above 800° C. and to liberate a gaseous component; various metal carbonates and sulfates belong into this group and carbonates of alkali metals or alkaline earth metals are a preferred group; for example, zinc sulfate will decompose at 770° C., sodium carbonate at about 1100° C. Generally, the term "decomposition temperature" refers to the temperature of transition of a compound into a thermally more stable form, frequently an oxide. For example, manganese dioxide ($MnO_2$) is capable of generating oxygen at various temperatures that may be determined by an additive, such as a ferric compound, e.g. FeC or FeSiN. In general, latent blowing agents for use in the invention are normally solid inorganic compounds that form at least one gaseous product when heated to the activation temperature which, frequently, will be in the range of from about 800° to 1400° C. Fusion (melting) of the latent blowing agent below its activation temperature does not detract from its utility. The latent blowing agent should be dispersed in the pellets as homogeneously as possible and the formation of many small voids within the expanding pellets is greatly preferred over formation of few large voids.

Pellets may be formed from aqueous slurries, e.g. by prilling, by mechanical compaction and similar prior art methods of forming granular particles or agglomerates from pulverulent solids. To that end, use of an additive known in the art and commonly called an agglomeration adjuvant or binder may be advantageous. Water-soluble silicates such as "waterglass" are an example. Some latent blowing agents, such as sodium carbonate in a dissolved or molten form, may also serve as agglomeration adjuvants. Adjuvants may be inorganic or organic and need not, but can, be thermally stable during expansion of the pellets.

Depending upon the method used for forming the pellets, drying or heating of the raw pellets may be of advantage. Generally, the pellets should have sufficient cohesion to withstand sieving and normal handling without substantial breakage.

BRIEF DESCRIPTION OF THE DRAWINGS

The invention will be explained in more detail with reference to the annexed drawings which illustrate preferred exemplary embodiments of the invention and wherein:

FIG. 2 is a diagrammatic illustration of an embodiment of the inventive process when operating with an electrically heated reactor;

FIG. 3 is a diagrammatic and enlarged sectional view of a pellet for use in the inventive process; and FIG. 4 is a diagrammatic and enlarged sectional view of an expanded pebble obtained by the inventive process.

DETAILED DESCRIPTION OF THE PREFERRED EMBODIMENTS

Figure 1:
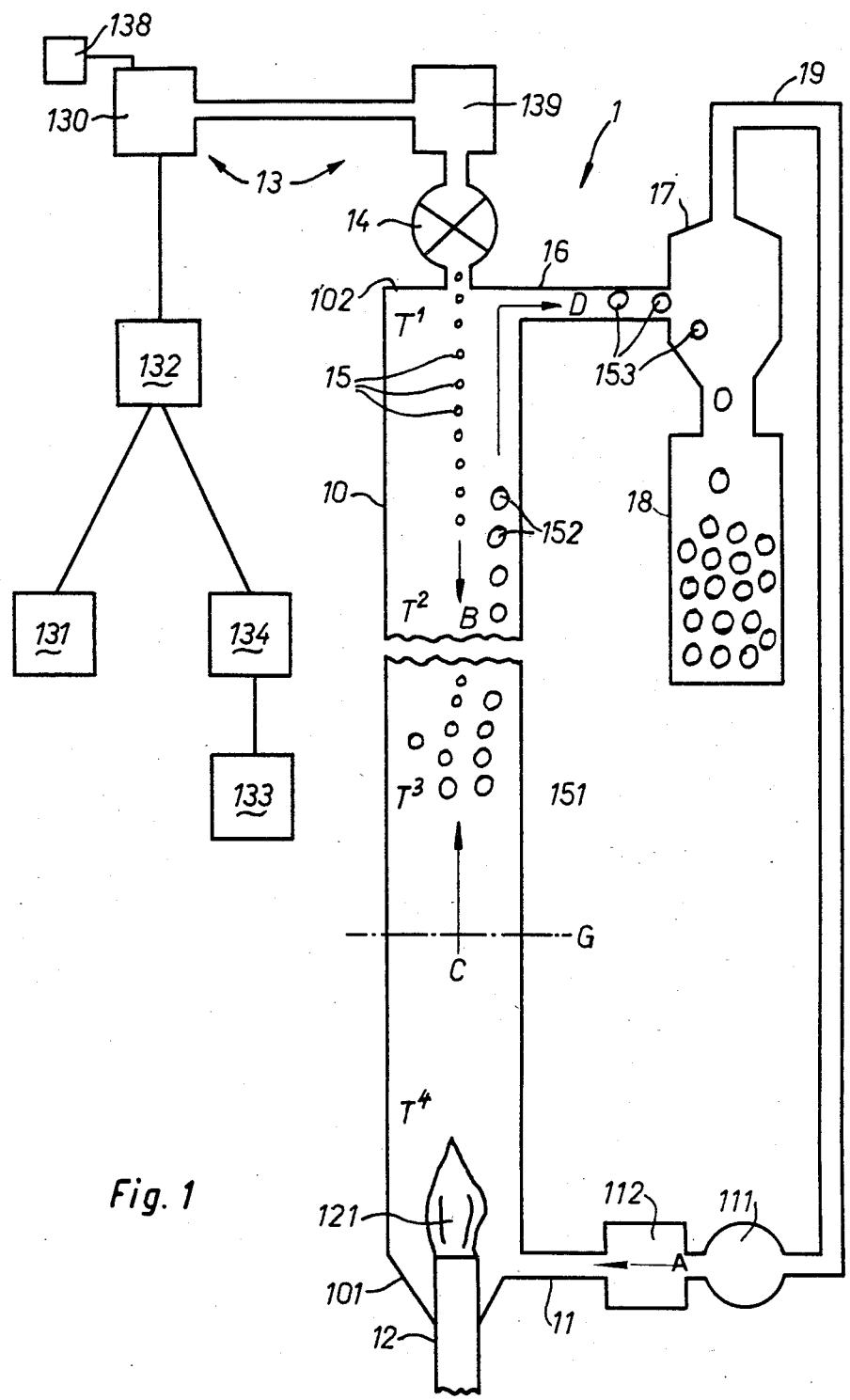
FIG. 1 is a diagrammatic illustration of an embodiment of the inventive process when operating with a flame-heated reactor.

The diagrammatic scheme of an integral system for carrying out the inventive process shown in FIG. 1 includes a reactor/separator unit and a pellet-producing unit.

The reactor 10 of unit 1 represented schematically as a sectioned tube or hollow cylinder is made of a heat-resistant structural material such as steel and/or ceramics, and has an external heat insulation layer (not shown). The length/width-ratio of reactor 10 is typically in the range of from 50:1 to 250:1 and the diameter may be constant or may vary continually or in a stepwise manner for optimization of aerodynamic parameters in the temperature regions explained below.

A gas infeed conduit 11 near the lower end 101 of reactor 10 provided with a blower 111 blows a gas, e.g. air, into the reactor in the direction of arrow A; the gas may be preheated in a heat exchange unit 112 operated e.g. with waste heat from the process. Burner 12 is provided to produce a heat control flame 121 generated by controlled combustion of a gaseous or liquid fuel.

Near the lower end 101 of reactor 10, the temperature $T^4$ of the rising gas stream will be at a maximum, e.g. in the range of from 900° to 1200° C., typically about 1000° C., and such temperatures are suitable for pellets consisting predominantly of vitreous materials.

Near the upper reactor end 102 the temperature $T^1$ of the gas stream rising in reactor 10 will be lowest, e.g. in the range of from 200° to 400° C. The temperature gradient or profile between $T^1$ and $T^2$ may be steady and the intermediate temperature zones $T^2$ and $T^3$ are indicated for purposes of explaining different stages of the fusion/expansion process of the expanding particles.

A charging valve 14 feeds a stream of agglomerated particles or pellets 15 falling in a substantially vertical direction indicated by arrow B, i.e. in counter-current to the stream of hot gas indicated by arrow C rising substantially in vertical direction in reactor 10. Typically, a reactor 10 may have a length in the range of from 10 to 40 m and a diameter in the range of from 0.1 to 0.5 m.

The velocity of the rising gas stream within reactor 10 may be in the range of from 1 to 10 m/sec or more.

Pellets 15 are made in a pellet-producing unit 13 e.g. comprising an extruder plus cutter unit 130 for producing granular particles, and a sieving machine 139 for producing particle size fractions within a predetermined range and/or size distribution; siliceous mineral fines are supplied from source 132 and a latent blowing agent, e.g. in the form of a solution or slurry, is supplied from source 138; the blowing agent composition may also serve as agglomeration adjuvant or contain the latter as an additional component.

The mineral fines may be provided from a first source 131, e.g. a milling and sieving unit, for reducing vitreous waste to a finely divided powder of predetermined particle sizes, and/or from a second source 134 for supplying sieved mineral fines produced in a combustion unit or oven 133. Generally, the particle size of the fines in source 132 should be below 50 μm, preferably in the range of from 1 to 10 μm. The volume ratio of the pellet stream to the gas stream preferably is low, e.g. in the range of from 1:1000 to 10,000.

Pellets 15 composed of vitreous or other silicaceous fines, latent blowing agent, and optional agglomeration adjuvant dropped into the rising gas stream will be dried while falling at a typical speed of about 3 m/sec through the first temperature zone $T^1$ (e.g. 200° to 400° C. for lower-melting vitreous materials and 300° to 600° C. for higher melting vitreous or non-vitreous materials); when using alkali silicate in aqueous solution as the agglomeration adjuvant, a silicaceous phase may be formed that connects the particles of pellets 15 and may serve as a skin-forming component.

The pellets will be heated progressively while falling through temperature zone $T^2$ (e.g. 400° to 700° C. for lower-melting vitreous and 500° to 800° C. for higher-melting vitreous or non-vitreous materials) where fusion will be limited to low-melting constituents and/or sintering effects. Substantial softening or fusion will occur in zone $T^3$ (e.g. 700° to 900° C. for low-melting vitreous and 800° to 1100° C. for high-melting vitreous or non-vitreous materials) at least in surface portion of the pellets, and a substantially coherent skin will be formed; the activation temperature of the latent blowing agent will be reached and after formation of such skin the pellets will begin to expand and to form partly expanded particles 151.

The increase of diameter of the particles 151 will continually decrease their falling velocity in the rising gas stream (typical gas velocity of about 8 m/sec) until, at a level designated as G between temperature zones $T^3$ and $T^4$ (e.g. 800° to 1200° C.), any pellet will stop to fall counter-current (arrow B), possibly float for some time at a relatively constant level, and then start to rise concurrently with the gas stream in the direction of arrow C. A predominant portion, at least, and preferably all particles 152 will be carried by and with the rising gas stream into progressively cooler zones $T^2$, $T^1$ and a stream of relatively cool expanded particles will be fed out of reactor 10 via conduit 16 near the upper reactor end together with a portion, at least, of the gas stream; conduit 16 opens into a separator 17, e.g. a cyclone connected to a storage bin 18 where the particles are separated from the gas stream and recovered as the target product.

A recirculation conduit 19 is connected with the separator for recirculation of the heat transfer gas into the process. An anti-adhesion device (not shown) may be provided, e.g. in the form of stationary or mobile electrodes or similar means capable of generating electrostatic charges or fields that will decrease adhesion of particles to the wall of reactor 10. An outlet (not shown) may be arranged at the lower reactor end 101 for discharge of molten mineral mass that may accumulate there as a result of particle adhesion to the reactor wall or because of the failure of some particles to become sufficiently expanded for reversal of motion.

FIG. 2 shows a diagrammatic view of a preferred process when using pellets of mineral compositions fusing in the higher temperature range, e.g. between 1000° and 1400° C. To this end, reactor system 2 comprises a lower portion 20 serving as an expansion furnace and an upper portion 21 serving as a preheating reactor portion or pellet preheater. Furnace 20 comprises a central tubular member 23 made of a material capable to support working temperatures of up to about 1400° C., e.g. a ceramic material. A thermally insulating jacket 24 surrounds a number of electric heating elements 25 (indicated by squares) arranged within a tubular interspace 240 between jacket 24 and central tube 23; the cylindrical space 230 encompassed by tube 23 forms the expansion chamber. Spaces 230 and 239 form the eactor space for the inventive process.

The upper reactor portion 21 is connected to an elongated heat exchanger 27 continuing through a number of turns and ending in separator 28. Inner tube 231 of the pellet preheater 21 is a functional extension of central tube 23 in an upward direction in that the elongated and substantially vertically extending reactor space is formed consisting of the pellet expansion space 230 as its lower part and the pellet preheating space 239 as its upper part.

Both the outer tube 241 and the inner tube 231 extend from the pellet preheater 21 into the heat exchanger so that an essentially coaxial system is formed for circulation of heat exchange gas through system 20 by means of a blower 29 that will cause and maintain a stream of heat exchange gas, e.g. air, to enter (arrows E) into chamber 240 where it is heated, e.g. by a series of electrical resistance heaters 25 (indicated in rectangular cross-section) and enters (arrows F) into expansion chamber 230 formed by tube 23 and having a tapered lower end 234. The temperature of the gas entering chamber 230 will typically be in the range of from 1200° to 1400° C. and this hot gas stream rises as indicated by arrow G towards the upper end of furnace 20.

A shunt conduit 26 with a control valve (not shown) may be provided to introduce gas of a somewhat lower temperature, e.g. about 800° C., that may be withdrawn at an appropriate portion from the heat exchanger 27 so as to form a temperature delimitation between the reactor spaces 230 and 239 and to maintain a predetermined temperature differential (fusion/non-fusion-temperature) between the expansion portion 230 and the preheating portion 239 of the reactor. The embodiment of the inventive process illustrated in FIG. 2 will be operated, for example, as follows:

A stream of individual pellets (not shown in FIG. 2) having differing particle diameters between 0.1 and 2 mm is fed via a pellet port 211 into preheating portion 239. The pellets can be prepared as explained above and the mineral composition of the pellets will have a fusion or softening temperature of typically above 1000° C. and up to 1400° C.; the latent blowing agent will be activated within that temperature range. The pellets are dropped continuously into the hot gas stream near the upper end of the preheating portion 239 of the reactor so as to maintain a low (e.g. 0.01 to 0.1%) pellet stream volume relative to the volume of the gas stream; the velocity of the gas stream will be in the range of from about 6 to about 10 m/sec so that the pellets will fall through space 239 at a speed of about 3 m/sec. Typically, the temperature of the gas stream rising through preheating portion 239 will be about 600° C. near its upper end (where the pellets are dropped into the stream) and about 800° C. near its lower end (where the shunt conduit 26 opens into the reactor space).

Generally, the temperature threshold produced between spaces 230 and 239 by the gas introduced via conduit 26 will be determined by the fusion or melting temperature of the mineral composition of the pellets so that fusion or softening of the pellets will occur but in the expansion portion 230 of the reactor.

Reactor dimensions can be essentially as explained above but the main factor is an effective residence time of the pellets and/or expanding particles within chamber 230 sufficient for reversal of motion (1st mode to 3rd mode) of the largest pellets as explained above; this, in turn, can be influenced by the physical length of the preheating chamber, the temperature gradient in the rising gas stream and aerodynamic factors including gas velocity, pellet mass and pellet shape.

Depending upon the mass of a given pellet, expansion and reversal of motion may occur shortly after entering chamber 230 or at any portion thereof above the tapered lower end 234 that forms a gorge where the velocity of the gas stream rising in chamber 230 will be at a maximum; as a consequence, the aerodynamic lifting force for counteracting gravity will increase significantly near the lower reactor end so as to act as dynamic stopper for pellets that have not become expanded sufficiently for second or third mode motion.

Still, some pellets might fall through chamber end 234 and a collector 245 is provided for withdrawing any molten mass that accumulates at the lower reator end. Again, the expanded particles formed within chamber 230 will be carried with the gas stream; because of the temperature gradient caused by shunt 26 at the transition from the expansion chamber 230 to the preheating chamber 239, problems of adhesion between expanded particles rising in third-mode motion with the hot gas stream and the pellets falling in first-mode motion into the gas stream can be minimized.

The expanded particles carried in third-mode motion with the gas stream through chamber 239 enter the heat exchanger 27 formed by extending tubes 231, 241 of the pellet preheater into tubes 237, 247 of heat exchanger 27 which, in essence, consists of a pair of coaxial spaces 271, 272 in which the inner part 271 carries the stream of expanded particles mixed with a major portion, at least, of the hot gas into the separator or cyclone 28; there, the expanded particles are recovered from collector 281.

The gas stream and the expanded particles entering through conduit 283 into separator 28 (arrow H) will have transferred most of their heat content through tube 237 to the gas stream that flows back from separator 28 through conduit 282, blower 29, and the annular conduit 272 formed between tubes 237, 247 and 231, 241 to the heating space 240 where the gas stream for feeding into chamber 230 is heated to the temperatures required for expansion of the pellets. Heat losses and environmental problems can be minimized in this manner.

FIG. 3 shows an enlarged diagrammatic cross-sectional view of a pellet 30 for use in the inventive process prior to expansion; it has a generally compact shape in that length, width and thickness of each particle approach unity (1:1:1). Preferred pellets 30 have a maximum diameter or largest cross-sectional dimension in the range of from 0.1 to 10 mm, and consist of an agglomerated mass of small particles 31 that, in turn, have maximum diameters of below 100 μm and preferably below 50 μm. Preferably, the latent blowing agent (not shown in FIG. 3) is a further particulate constituent homogeneously dispersed throughout the body of each pellet. The optional agglomeration adjuvant can be an interfacial film (not shown) between the particles 31.

An illustrative example of the composition of a pellet 30 is an agglomerated mass of natural fines obtained as a sediment from sand and gravel washing; the fusion points of such fines obtained from varying sources was in the range of from 1180° to 1260° C. Sodium carbonate (2 to 3% by weight of the pellet) was used as an agglomeration adjuvant. The latent blowing agent was a mixture of equal parts by weight of $MnO_2$ and FeSiN used in an amount of 1 to 2% by weight of the pellet. Alternatively, the $MnO_2$ may be omitted and the FeSiN replaced by silicon carbide because SiC reacts with many silicaceous melts to generate a gaseous reaction product.

The analytical composition (in percent by weight; after heating at 1500° C. to constant weight) of the natural fines was as follows:

| |
|---|
| 42.4 to 56.5% $SiO_2$ |
| 6.1 to 14.0% $Al_2O_3$ |
| 2.3 to 6.1% $Fe_2O_3$ |
| 0.3 to 0.7% $TiO_2$ |
| 14.0 to 35.0% CaO |
| 2.4 to 11.0% MgO |
| 0.05 to 0.2% MnO |
| 1.0 to 2.6% $K_2O$ |
| 0.6 to 1.8% $Na_2O$ |
| 0.1 to 0.2% $P_2O_5$ |
| summing up to 100%. |

FIG. 4 shows an enlarged diagrammatic cross-sectional view of an expanded pebble 40 obtained from a pellet as shown in FIG. 3 by the expansion method illustrated in FIG. 2. Each such pebble has a spheroidal shape and a generally smooth and coherent i.e. unbroken outer skin 41. The inner structure is that of a continuous phase or matrix 42 in which numerous spherical voids 43 with diameters in the microscopic (0.1 to 10 μm) to macroscopic (0.01 to 0.5 mm) range are dispersed. The voids are substantially closed, i.e. few if any voids 43 communicate with each other thus representing what is generally termed a cellular structure (as opposed to a "porous" structure of intercommunicating voids).

In general, cellular structures having more and smaller voids are preferred over those having fewer and larger voids and the actual structure of a pellet 4 would show many additional but minute voids.

The specific weight of the pellets 30 will generally be in the range of from 1.5 to 3 while the specific weight of the expanded pebbles 40 according to the invention will be in the light-weight range of from 0.1 to 1.2. Preferably, an expanded light-weight filler according to the invention consists of pebbles 40 of differing diameters within the general range of from about 0.1 to about 20 mm and having a specific weight in the range of from 0.2 to 0.8, notably 0.2 to 0.5.

While preferred embodiments of the present invention are shown and described herein, it is to be understood that the invention is not limited thereto but may be embodied and practiced within the scope of the following claims.

Accordingly,

What I claim is:

1. A process for producing an expanded mineral material consisting essentially of a multiplicity of discrete spheroidal particles having a generally cellular structure and being suitable for use as a sand or gravel constituent of a concrete mix; said process comprising the steps of:

(a) providing a stream of individual pellets comprising a fusible mineral composition and a latent blowing agent;
(b) continuously dropping said pellets into a hot gas stream contained in an elongated, vertically extending reactor space and moving essentially in an upward direction counter-current to said pellets for heat exchange between said pellets and said hot gas to progressively heat said pellets while moving counter-current to said hot gas;
(c) allowing said pellets to fall through a sufficient length of said elongated reactor space for causing fusion of said mineral composition, activation of said blowing agent, and expansion of said pellets until a major portion, at least, of said pellets becomes expanded sufficiently for floating in and moving with said stream of hot gas to form a stream of expanded particles carried by said hot gas stream;
(d) guiding said stream of expanded particles with a portion, at least, of said gas stream out of said reactor space; and
(e) separating said expanded particles from said hot gas stream.

2. The process of claim 1, wherein each of said pellets is a generally spheroidal agglomerate formed of said fusible mineral composition in a finely divided pulverulent state; said pellets having a diameter in the range of from about 0.1 to about 3 mm and containing said latent blowing agent in a substantially homogeneous distribution.

3. The process of claim 2, wherein each of said pellets is formed by agglomeration of a pulverulent mixture comprising said mineral composition, said latent blowing agent, and an agglomeration adjuvant, said pulverulent mixture being formed of particles each having a diameter of below about 0.05 mm.

4. The process of claim 2, wherein said mineral composition is selected from vitreous materials, fly-ash, mineral sediment substance, sand, solid combustion residues, and mixtures thereof.

5. The process of claim 1, wherein said pellets of said stream have differing diameters within the range of from about 0.1 to about 3 mm and wherein said expanded particles obtained in step (e) have differing diameters within the range of from about 0.2 to about 10 mm.

6. The process of claim 1, wherein a decreasing temperature gradient is provided within said reactor space extending from a lower zone having temperatures above the fusion temperature of said mineral composition to an upper zone having temperatures below the fusion temperature of said mineral composition.

7. A light-weight mineral filler consisting of expanded spheroidal pebbles having differing diameters in the range of from about 0.1 mm to about 20 mm, each pebble having a substantially smooth and unbroken outer skin enclosing a cellular structure formed by a matrix of a mineral material having a fusion or softening temperature in the range of from about 800° C. to about 1400° C. and enclosing a multiplicity of substantially closed spherical voids.

* * * * *